(12) United States Patent
Damari

(10) Patent No.: US 9,073,409 B1
(45) Date of Patent: Jul. 7, 2015

(54) VEHICLE SUN VISOR EXTENDER

(71) Applicant: Rami Damari, Rehovot (IL)

(72) Inventor: Rami Damari, Rehovot (IL)

( * ) Notice: Subject to any disclaimer, the term of this patent is extended or adjusted under 35 U.S.C. 154(b) by 0 days.

(21) Appl. No.: 14/556,166

(22) Filed: Nov. 30, 2014

(30) Foreign Application Priority Data

Mar. 6, 2014 (IL) .......................................... 231336

(51) Int. Cl.
*B60J 3/02* (2006.01)
*B60R 7/05* (2006.01)

(52) U.S. Cl.
CPC .................. *B60J 3/0208* (2013.01); *B60R 7/05* (2013.01); *B60J 3/0234* (2013.01)

(58) Field of Classification Search
CPC .................................... G60J 3/0208; G60J 3/02
USPC ....................................................... 296/97.6
See application file for complete search history.

(56) References Cited

U.S. PATENT DOCUMENTS

| | | | | |
|---|---|---|---|---|
| 4,792,176 A | * | 12/1988 | Karford ........................ | 296/97.8 |
| 4,950,021 A | * | 8/1990 | Vandagriff .................... | 296/97.6 |
| 4,988,139 A | * | 1/1991 | Yamada ........................ | 296/97.2 |
| 5,165,748 A | * | 11/1992 | O'Connor .................... | 296/97.6 |
| 5,259,657 A | * | 11/1993 | Arendt et al. ................. | 296/97.6 |
| 5,402,924 A | * | 4/1995 | Gilson .......................... | 224/312 |
| 5,445,427 A | * | 8/1995 | Vandagriff .................... | 296/97.6 |
| 5,829,816 A | * | 11/1998 | Cimmino ..................... | 296/97.6 |
| 6,176,539 B1 | * | 1/2001 | Westerman ................... | 296/97.6 |
| 7,540,553 B1 | * | 6/2009 | Mullis .......................... | 296/97.8 |
| 7,722,109 B1 | | 5/2010 | McGehee | |
| 8,544,933 B1 | * | 10/2013 | Fuller .......................... | 296/97.6 |
| 8,876,185 B1 | * | 11/2014 | Edwards, Sr. ................ | 296/97.8 |
| 2008/0315616 A1 | | 12/2008 | Wang | |
| 2010/0219655 A1 | | 9/2010 | Rymer, Jr. | |
| 2011/0001332 A1 | * | 1/2011 | Weber .......................... | 296/97.6 |

* cited by examiner

*Primary Examiner* — H Gutman
(74) *Attorney, Agent, or Firm* — Daniel J. Swirsky; AlphaPatent Associates Ltd.

(57) ABSTRACT

A vehicle sun visor extender, comprising: a first panel and a second panel, at least short sides or corners thereof being fixed one to the other; a first and a second strap threaded between the first and second panels, for embracing thereof to an existing vehicle sun visor, ends of each of the first and second straps comprising separable fastening means for applying the embracing; and a third panel disposed between the second panel and the existing vehicle sun visor, the third panel for limiting sliding of the third panel in relation to the second panel, the third panel comprising an additional width being at the corner thereof, thereby the third panel upon being extended, shades an area below a top of a side window, which would have been exposed due to a tilt of the existing vehicle sun visor.

7 Claims, 7 Drawing Sheets

VEHICLE SUN VISOR EXTENDER

CROSS-REFERENCE TO RELATED APPLICATIONS

This application claims priority from Israel Patent Application No. 231,336, filed Mar. 6, 2014, the contents of which are incorporated herein by reference in their entirety.

TECHNICAL FIELD

The present invention relates to the field of vehicle sun visors. More particularly, the invention relates to an extender for an existing sun visor.

BACKGROUND

U.S. Pat. No. 7,722,109 discloses a vehicle sun visor and an extension therefor. However, the extension must be available for connecting thereof to an existing sun visor.

It is an object of the present invention to provide a sun visor extender, for connecting to an existing sun visor by the user.

It is an object of the present invention to provide a solution to the above-mentioned and other problems of the prior art.

Other objects and advantages of the invention will become apparent as the description proceeds.

SUMMARY OF THE INVENTION

A vehicle sun visor extender, comprising:
a first panel and a second panel, at least short sides or corners thereof being fixed one to the other;
a first and a second strap threaded between the first and second panels, for embracing thereof to an existing vehicle sun visor, ends of each of the first and second straps comprising separable fastening means for applying the embracing; and
a third panel disposed between the second panel and the existing vehicle sun visor, the third panel comprising at least one track for limiting sliding of the third panel in relation to the second panel, the sliding for setting a length of the vehicle sun visor extender, the third panel comprising an additional width being at the corner thereof,
thereby the third panel upon being extended, shades an area below a top of a side window, which would have been exposed due to a tilt of the existing vehicle sun visor.

BRIEF DESCRIPTION OF DRAWINGS

Embodiments, features, aspects and advantages of the present invention are described herein in conjunction with the following drawings.

It should be understood that the drawings are not necessarily drawn to scale.

DETAILED DESCRIPTION

The present invention will be understood from the following detailed description of various embodiments, which are meant to be descriptive and not limiting. For the sake of brevity, some well-known features, methods, systems, procedures, components, circuits, and so on, are not described in detail.

Figure 1:
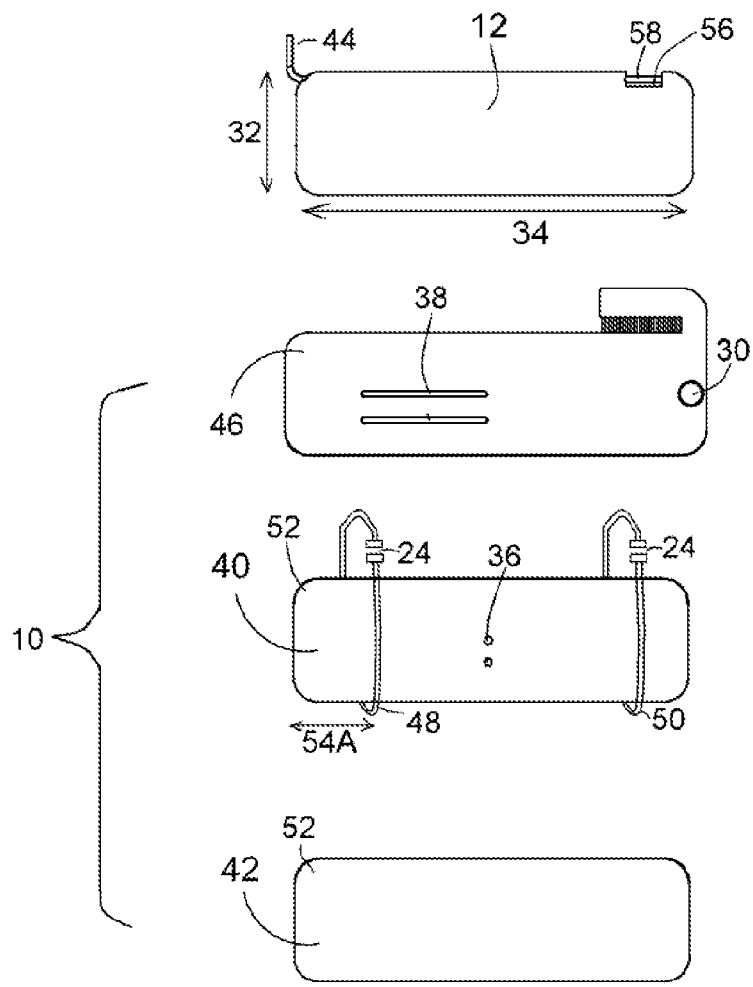
FIG. 1 depicts the elements of an existing vehicle sun visor and of a sun visor extender according to one embodiment of the present invention.

FIG. 1 depicts the elements of an existing vehicle sun visor and of a sun visor extender according to one embodiment of the present invention.

A shading extender 10, including panels 40, 42 and 46, is designed to be connected to an existing vehicle sun visor 12. The length of each of panels 40, 42 and 46 is substantially the long side 34 of sun visor 12; and the width of each of panels 40, 42 and 46 is substantially the short side 32 of sun visor 12

The existing vehicle sun visor 12 is pivotally connected to the vehicle, via a pivot 44.

Figure 2:
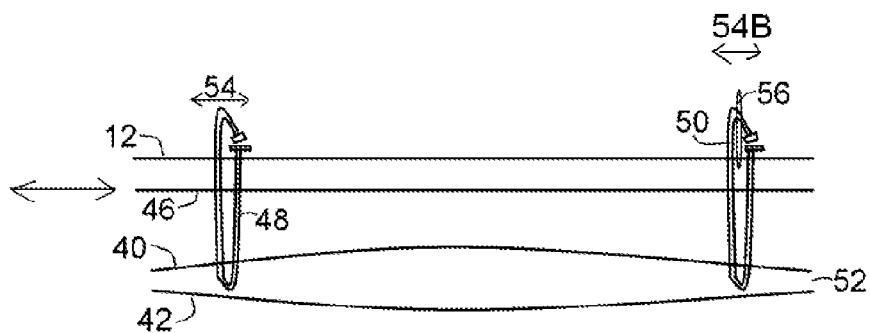
FIG. 2 schematically describes the connections of the vehicle sun visor and the panels of the shading extender of the present invention.

FIG. 2 schematically describes the connections of the vehicle sun visor and the panels of the shading extender of the present invention.

Panels 40 and 42 of the shading extender 10 are fixed one to the other at least at the short sides 32 or at the corners 52 thereof in a non-separable manner, such as by stationary fasteners, sewing, heating, glue, etc. Straps 48 and 50 are threaded between panels 40 and 42, wherein the fixing does not allow releasing straps 48 and 50 from panels 40 and 42. However, regarding the limitations provided by panels 40 and 42, straps 48 and 50 are free to change the location thereof along the long sides 34, between panels 40 and 42, as shown by arrow 54.

Figure 3:
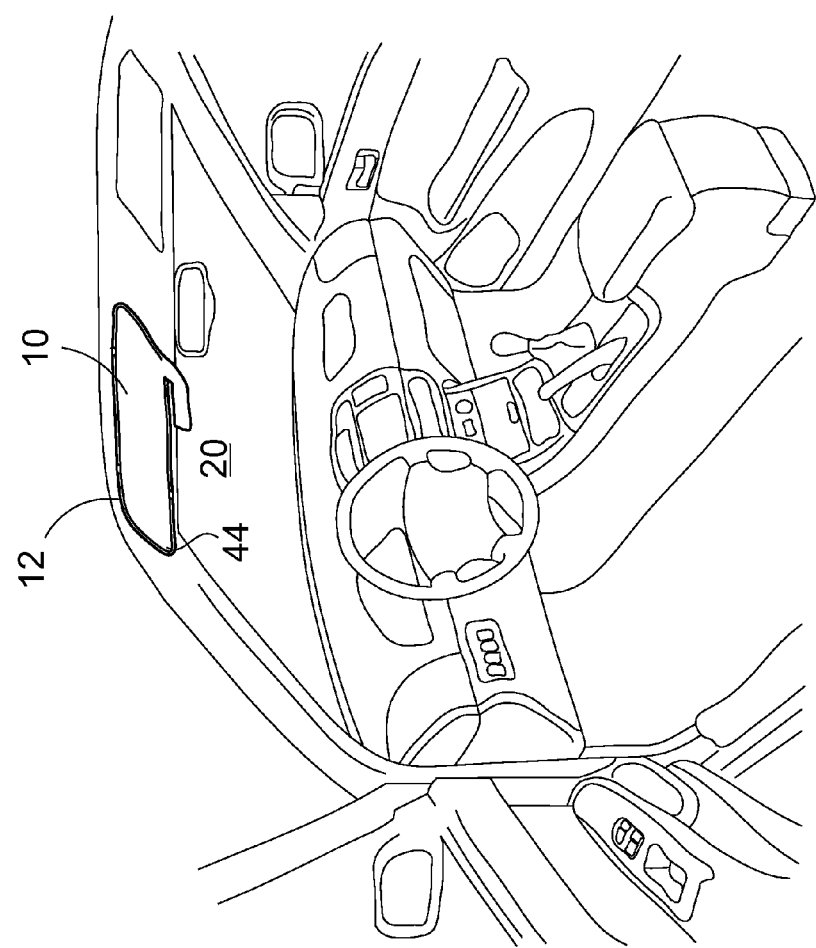
FIG. 3 depicts the existing vehicle sun visor and of a sun visor extender attached to the ceiling of the vehicle.

FIG. 3 depicts the existing vehicle sun visor and of a sun visor extender of FIG. 1 at the first step.

At the first step, the existing vehicle sun visor 12 and a sun visor extender 10 are attached to the ceiling of the vehicle.

Figure 4:
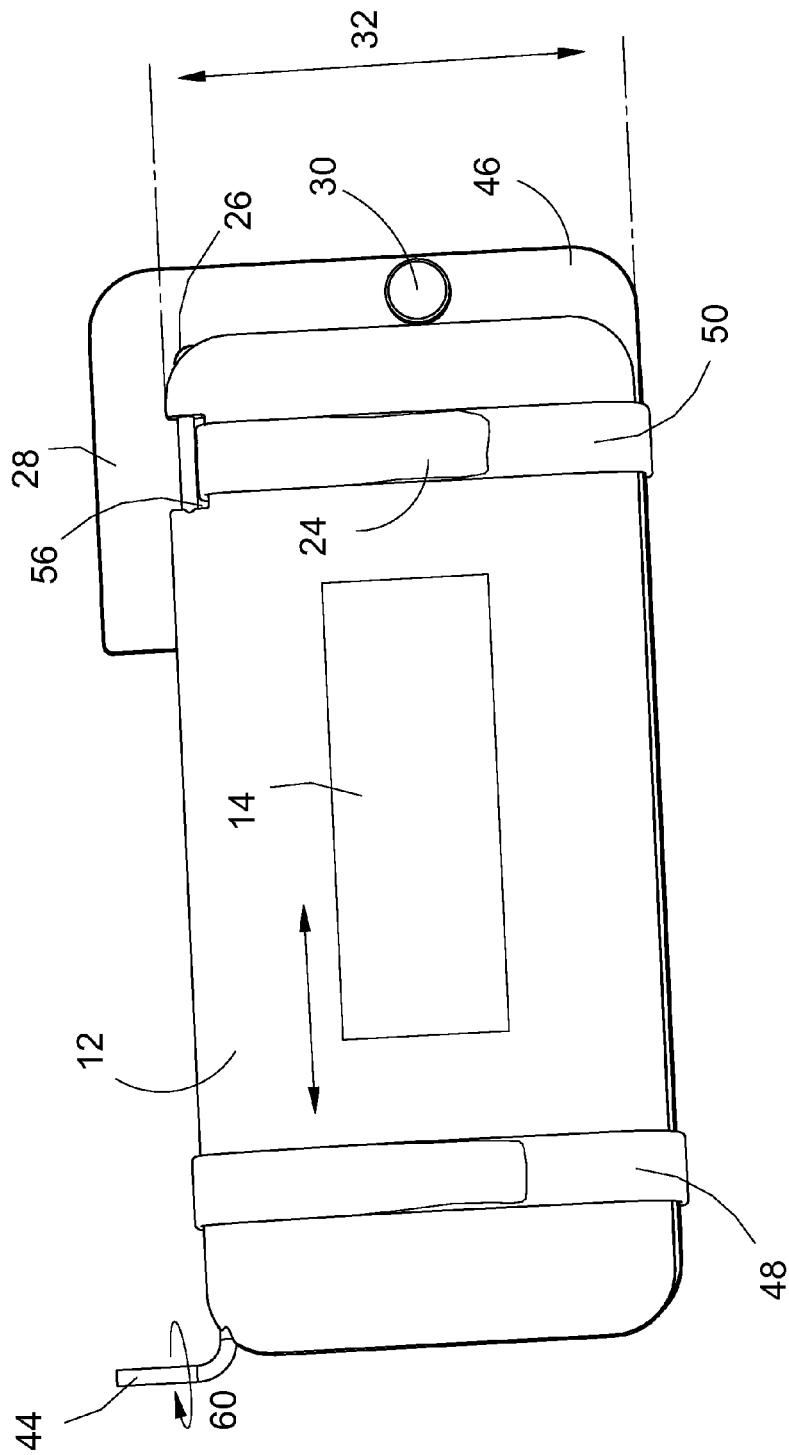
FIG. 4 is a front view of the existing vehicle sun visor and of a sun visor extender of FIG. 1.

FIG. 4 is a front view of the existing vehicle sun visor and of the sun visor extender at the second step.

The front view of FIG. 4 shows the existing vehicle sun visor 12 and of the sun visor extender 10 at the position of rotating them from the position of FIG. 3, being the first step, to the position of covering the top of the front window, being the second step.

In the front view of FIG. 4, the existing vehicle sun visor 12 is shown in the front, panel 46 is disposed behind it, and panels 40 and 42 hidden therebehind.

Panel 46 is longer and wider at the corner. The additional width at the corner, being in addition to the short side 32 of panel 46, is enumerated 28.

According to one embodiment, strap 50 is threaded within a slit 56 (shown also in FIG. 1) of the existing vehicle sun visor 12. According to this embodiment, slit 56 does not allow strap 50 to change the location thereof between panels 40 and 42, as shown by arrow 54. Thus, according to this embodiment, only strap 48 is free to change the location thereof between panels 40 and 42, as shown by arrow 54A.

According to another embodiment strap 50 as well is free to change the location thereof, as shown by an arrow 54B.

The freedom to change the location of strap 48 is advantaged in that strap 48 may be moved for not covering a mirror 14 or a screen or another object of the existing sun visor 12.

Each of straps 48 and 50 embraces the existing vehicle sun visor 12 upon connecting the ends of each one, one to the other, by separable fastening means 24, such as by a Velcro fastener.

Referring again to FIG. 2, since straps 48 and 50 are threaded between panels 40 and 42, and since each of straps 48 and 50 embraces the existing vehicle sun visor 12, straps 48 and 50 embrace panel 40 to the existing vehicle sun visor 12.

Since strap 50 embraces panel 40 to the existing vehicle sun visor 12, and since panel 46 is disposed therebetween, for sliding therebetween, strap 50 also embraces panel 46. Thus, the width of panel 46, apparently, cannot be greater than that of sun visor 12 and of panel 40. However, since panel 46 includes the additional width 28 at the corner thereof, panel 46 includes a slit 26 between the top of panel 46 and the additional width 28 thereof, for allowing strap 50 insertion thereinto.

Referring again to FIG. 4, since the existing vehicle sun visor 12 is pivotally connected to the vehicle, via pivot 44, vehicle sun visor 12 together with shading extender 10, may be rotated about pivot 44 as depicted by arrow 60.

Figure 5:
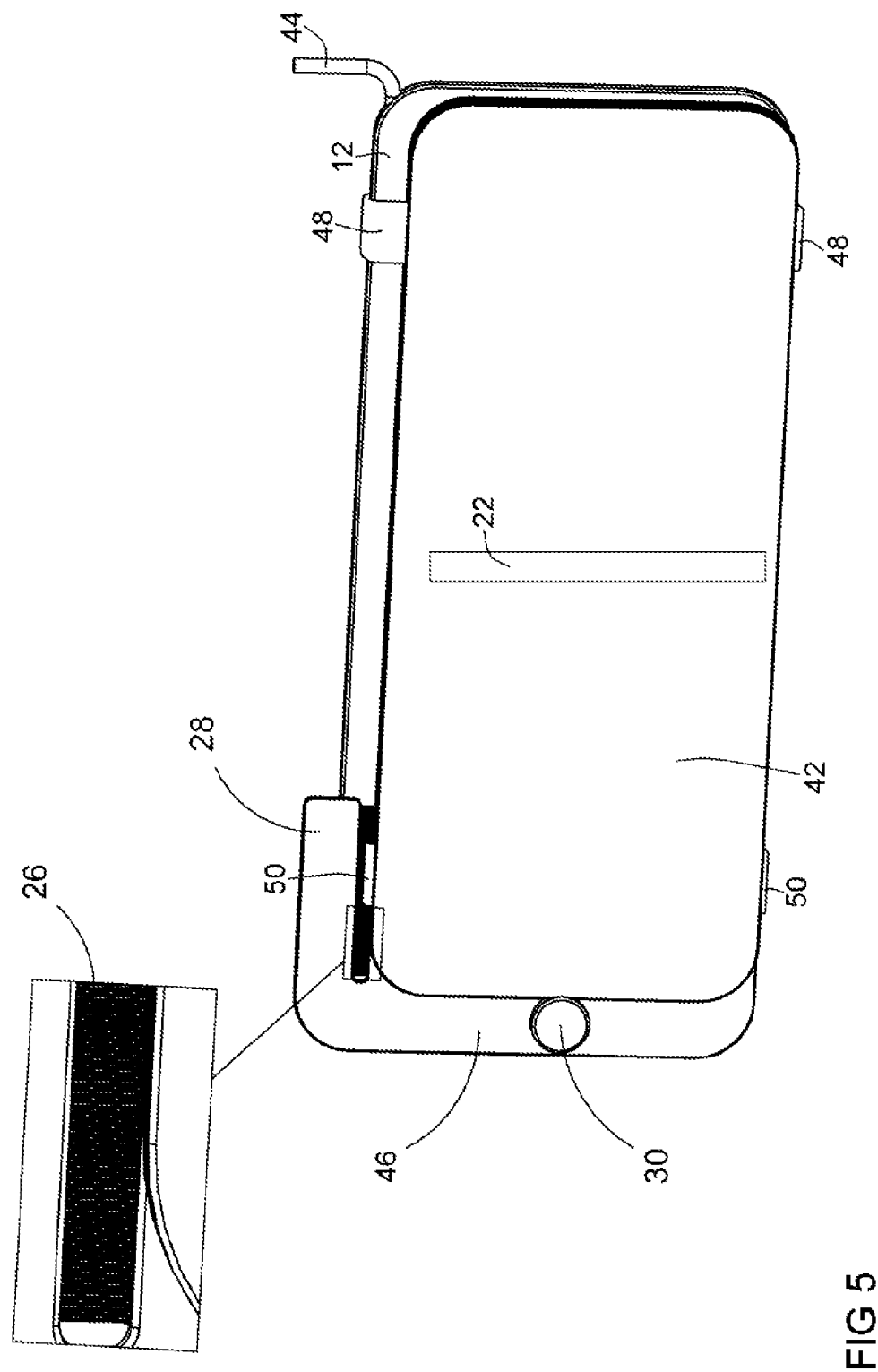
FIG. 5 is a rear view of the existing vehicle sun visor and of a sun visor extender of FIG. 1 after rotating the pivot about arrow 60 from the position of FIG. 4.

FIG. 5 is a rear view of the existing vehicle sun visor and of a sun visor extender of FIG. 1 at the third step.

The third step is after rotating the pivot about arrow 60 from the position of FIG. 4, being the second step.

In the rear view of FIG. 5, panel 42 is shown at the front, panel 40 is hidden therebehind, panel 46 is shown therebehind, and panel 12 is disposed behind panel 46.

Slit 26 may constitute a brush, for not allowing sun rays to cross therethrough, while allowing strap 50 insertion thereinto.

Panel 42, being at the front at this position, may include one or more compartments 22 or other containing cells, for containing maps, receipts, tickets and other documents.

Figure 6:
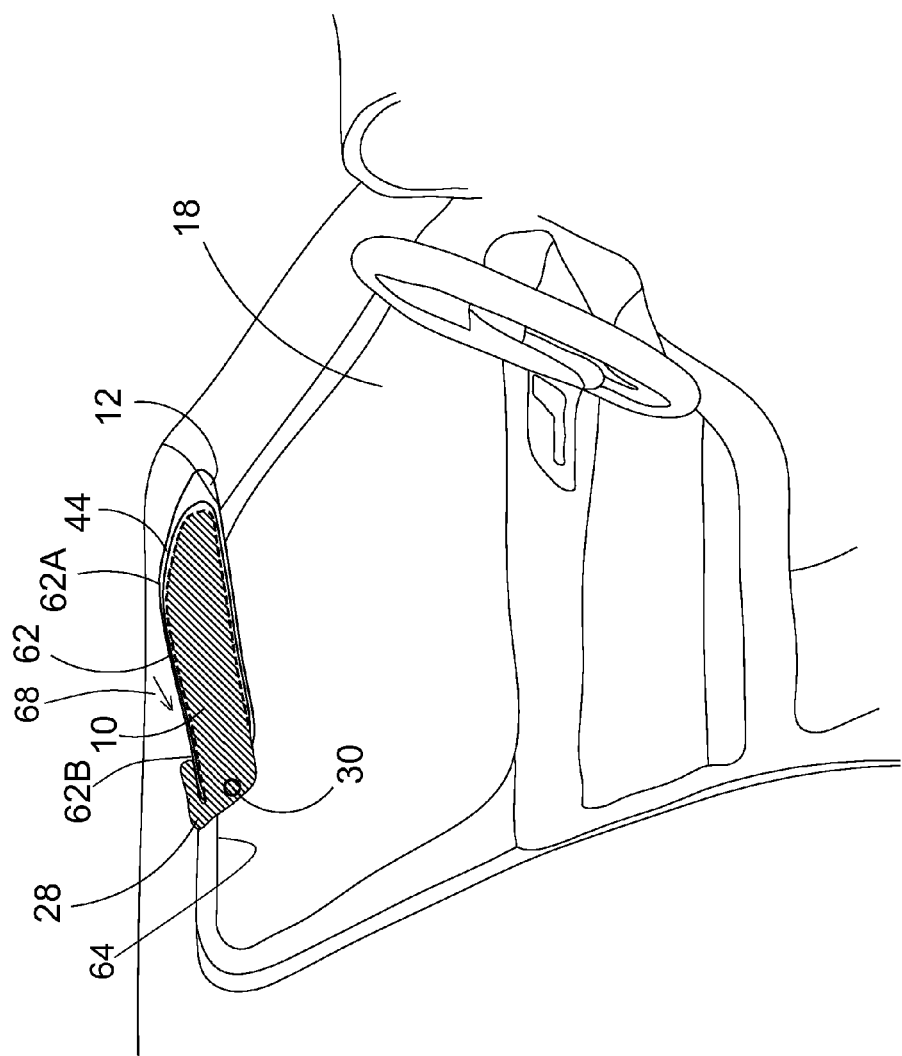
FIG. 6 depicts the existing vehicle sun visor and of a sun visor extender covering the top of the left window, in which the rear view of FIG. 5 is shown, prior to applying the extension.

FIG. 6 depicts the existing vehicle sun visor and a sun visor extender at the third step of covering the top of the left window, in which the rear view of FIG. 5 is shown, prior to applying the extension.

Typically, and without the inventive sun visor extender 10, at the third step being upon covering the left window 18, pivot 44 locates the top 62 of the existing sun visor 12 in a tilted position, demonstrated by arrow 68. FIG. 6 illustrates the tilting 68 by the front side 62A of the top 62 of the existing sun visor 12 being higher than the rear side 62B thereof. The front side 62A of the top 62 of the existing sun visor 12 is disposed higher than the top of the left window 18, such that the in spite of the tilt 68, the existing sun visor 12 does not expose the top of the side (left or right) window 18 to the sun.

Referring again to FIG. 1, panels 40 and 46 are slideably connected one to the other by one or more tracks 38 of panel 46 and a nut 36 of panel 40 for each track 38, e.g., there are two track 38 and two nuts 36.

Figure 7:
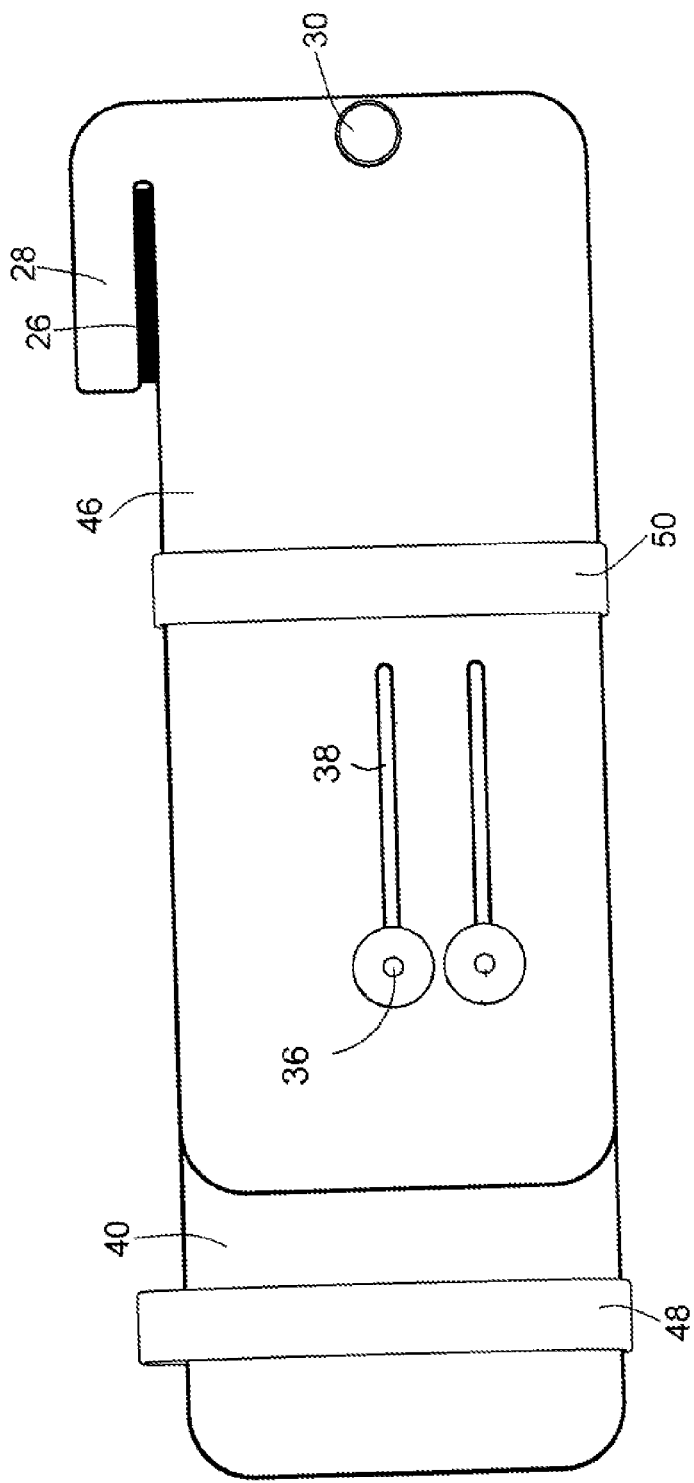
FIG. 7 depicts panels 40 and 46 only, for depicting the slideability of one panel in relation to the other.

FIG. 7 depicts panels 40 and 46 only at the fourth step, for depicting the slideability of one panel in relation to the other.

Figure 8:
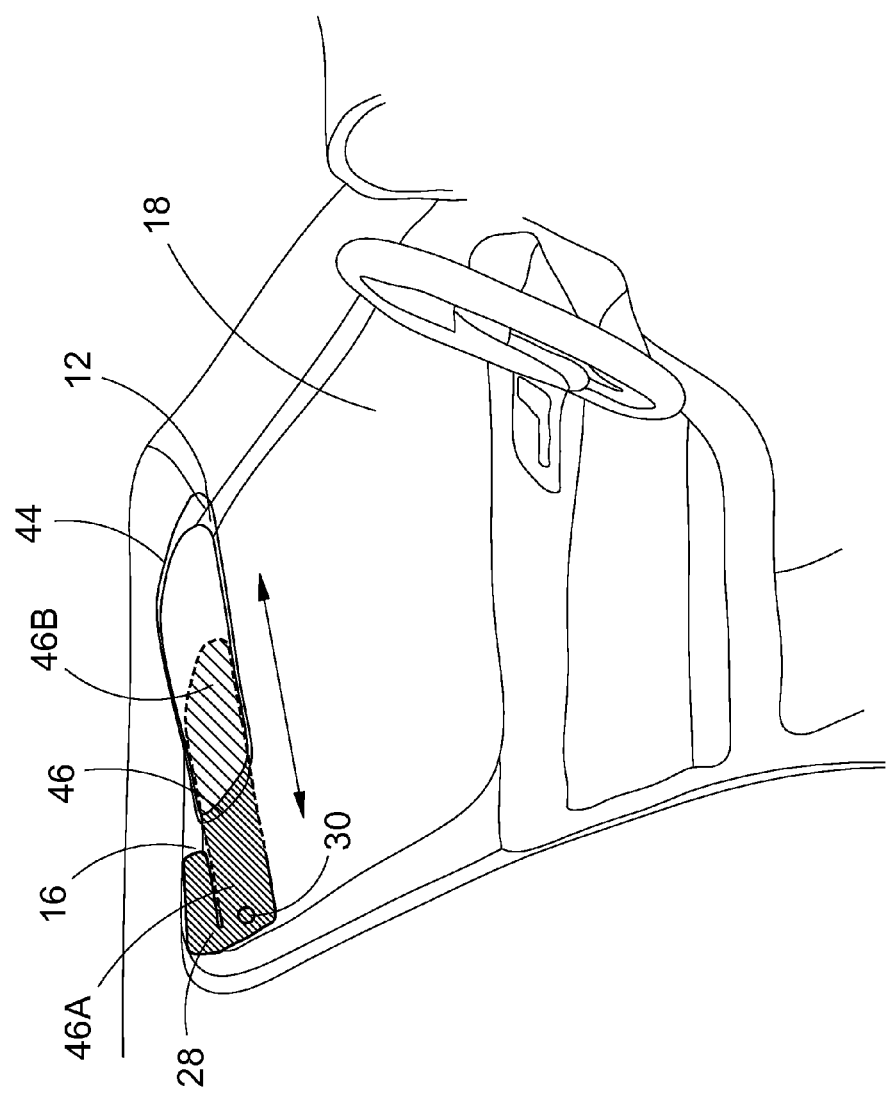
FIG. 8 depicts the existing vehicle sun visor of the vehicle and the shading extender covering the top of the left window, in the extended state.

FIG. 8 depicts the existing vehicle sun visor of the vehicle and the shading extender covering the top 64 of the left window 18, in the extended state, being the fourth step.

Since rotation of the existing sun visor 12 towards the left window 18 forms the tilting 68 described in FIG. 6, a space 16 between the top 64 (enumerated in FIG. 6) of the side (left or right) window 18 and top of panel 46 would have been present, without the presence of the additional width 28. Thus, the additional width 28 is essential, for shading this space 16.

Space 16 is shown in the figure for demonstration purposes, even though an appropriate design, such as of an additional width 28 being wider than that of the figure, preferably shades this space 16.

Upon sliding panel 46 out at the fourth step, a portion 46B thereof is congruent with the other panels, while a portion 46A protrudes out. According to one embodiment, at least the material of the protruding portion 46A may constitute a transparent plate, such as of glass or perspex, coated with a one-directional ray coating, for allowing the driver viewing therethrough, and for not allowing sun rays cross therethrough.

The figures and the foregoing descriptions have described the left shading extender 10 fitted to the left existing vehicle sun visor 12, i.e., for a person sitting at the left front seat of the vehicle, for changing the position thereof from the left side of the front window to the front left window. Appropriate changes are to be made for describing a right shading extender 10 fitting to a right existing vehicle sun visor.

Thus, the present invention is directed to a vehicle sun visor extender (10), comprising:

a first panel (42) and a second panel (40), at least short sides (32) or corners (52) thereof being fixed one to the other;

a first (48) and a second strap (50) threaded between the first (42) and second (40) panels, for embracing thereof to an existing vehicle sun visor (12), ends (24) of each of the first and second straps (48, 50) comprising separable fastening means (24) for applying the embracing; and a third panel (46) disposed between the second panel (40) and the existing vehicle sun visor (12), the third panel (46) comprising at least one track (38) for limiting sliding of the third panel (46) in relation to the second panel (40), the sliding for setting a length of the vehicle sun visor extender (10), the third panel (46) comprising an additional width (28) being at the corner thereof, thereby the third panel (46) upon being extended, shades an area (16) below a top (64) of a side window (18), which would have been exposed due to a tilt (68) of the existing vehicle sun visor (12).

According to one embodiment, the first (48) strap is not threaded into a slit (56) of the existing vehicle sun visor (12), thereby allowing the first (48) strap to change (54A) a location thereof, thereby allowing the first strap (48) not to cover an object (14) of the existing vehicle sun visor (12).

The second (50) strap may be threaded into a slit (56) of the existing vehicle sun visor (12), thereby not allowing the second (50) strap to change a location thereof.

The third panel (46) may comprise a slit (26) between the additional width (28) and the third panel (46), for allowing the second strap (50) to enter thereinto.

The separable fastening means (24) of each of the first (48) and second straps (50) may comprise a Velcro fastener, thereby allowing a non-professional user to connect the vehicle sun visor extender (10) to the existing vehicle sun visor (12).

The first panel (42) may comprise at least one compartment (22) for lodging objects.

At least a portion (46A) of the third panel (46) may comprise a transparent plate coated with a one-directional ray coating, for allowing viewing therethrough, and for not allowing sun rays cross therethrough.

In the figures and/or description herein, the following reference numerals (Reference Signs List) have been mentioned:

numeral 10 denotes a sun visor extender, according to one embodiment of the present invention;

numeral 12 denotes an existing vehicle sun visor;

numeral 14 denotes a mirror of the existing vehicle sun visor;

numeral 16 denotes a space between the top of the left window and the top of the sun visor, which would have been present without the additional width 28;

numeral 18 denotes the left window of the vehicle;

numeral 20 denotes the front window of the vehicle;

numeral 22 denotes a pocket or a compartment in one of the panels;

numeral 24 denotes separable fastening means 24, such as a Velcro fastener;

numeral 26 denotes a slit in one of the panels, below an additional width thereof;

numeral 28 denotes the length of the existing sun visor;

numeral 30 denotes a handle of one of the panels of the sun visor extender, for extending the sun visor;

numeral 32 denotes the short side of the existing sun visor;

numeral 34 denotes the long side of the existing sun visor;

numeral 36 denotes a nut;

numeral 38 denotes a track;

numerals 40 and 42 denotes panels;

numeral 44 denotes a pivot of the existing sun visor;

numeral 46 denotes a panel;

numerals 48 and 50 denote straps;

numeral 52 denotes a corner of a panel;

numeral 54, 54A and 54B denote arrows of movement;

numeral 56 denotes a slit in the existing sun visor; this slit is formed by a hinge enumerated 58, about which the existing sun visor may be rotated;

numeral 58 denotes the hinge about which the existing sun visor may be rotated;

numeral 60 denotes an arrow;

numeral 62 denotes the top of the existing sun visor;

numerals 62A and 62B denote two sides of the top of the existing sun visor;

numeral 64 denotes the top of the left or the right window; and numeral 68 denotes a typical tilt of the existing sun visor.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

What is claimed is:

1. A vehicle sun visor extender, comprising:
    a first panel and a second panel, at least short sides or corners thereof being fixed one to the other;
    a first and a second strap threaded between said first and second panels, for embracing thereof to an existing vehicle sun visor, ends of each of said first and second straps comprising separable fastening means for applying said embracing; and
    a third panel disposed between said second panel and said existing vehicle sun visor, said third panel comprising at least one track for limiting sliding of said third panel in relation to said second panel, the sliding for setting a length of said vehicle sun visor extender, said third panel comprising an additional width being at the corner thereof,
    thereby said third panel upon being extended, shades an area below a top of a side window, which would have been exposed due to a tilt of said existing vehicle sun visor.

2. A vehicle sun visor extender according to claim 1, wherein said first strap is not threaded into a slit of said existing vehicle sun visor, thereby allowing said first strap to change a location thereof, thereby allowing said first strap not to cover an object of said existing vehicle sun visor.

3. A vehicle sun visor extender according to claim 1, wherein said second strap is threaded into a slit of said existing vehicle sun visor, thereby not allowing said second strap to change a location thereof.

4. A vehicle sun visor extender according to claim 1, wherein said third panel comprises a slit between said additional width and said third panel, for allowing said second strap to enter thereinto.

5. A vehicle sun visor extender according to claim 1, wherein said separable fastening means of each of said first and second straps comprises a Velcro fastener, thereby allowing a non-professional user to connect said vehicle sun visor extender to the existing vehicle sun visor.

6. A vehicle sun visor extender according to claim 1, wherein said first panel comprises at least one compartment for lodging objects.

7. A vehicle sun visor extender according to claim 1, wherein at least a portion of said third panel comprises a transparent plate coated with a one-directional ray coating, for allowing viewing therethrough, and for not allowing sun rays cross therethrough.

* * * * *